United States Patent

Hyllberg et al.

[11] Patent Number: 5,984,848
[45] Date of Patent: Nov. 16, 1999

[54] HEATED ROLLER WITH INTEGRAL HEAT PIPE

[75] Inventors: Bruce E. Hyllberg, Gurnee, Ill.; Gary S. Butters, Greenfield, Wis.; Thomas S. Smith, Spring Grove, Ill.; Randy L. Mittelstaedt, Muskego, Wis.

[73] Assignee: American Roller Company, Union Grove, Wis.

[21] Appl. No.: 09/003,429

[22] Filed: Jan. 6, 1998

Related U.S. Application Data

[63] Continuation of application No. 08/783,597, Jan. 13, 1997, abandoned.
[51] Int. Cl.⁶ ..................................................... B23P 15/00
[52] U.S. Cl. ............................................. 492/46; 165/89
[58] Field of Search ............................. 492/46; 399/333; 118/60; 219/216, 469, 470; 432/60; 165/89

Primary Examiner—I Cuda
Attorney, Agent, or Firm—Quarles & Brady LLP

[57] ABSTRACT

A heat transfer roller in a machine for coating, printing, copying or heating a web, has a hollow cylindrical roller core and a metal sleeve for conducting heat to or from an object contacting an outer surface of the roller. A ring-shaped cavity for receiving a heat transfer medium is formed between the cylindrical roller core and the sleeve (15) and extends the length of the roller excluding portions on respective ends. Cartridge heaters are provided for heating the outer wall of the core to further heat the heat transfer medium in the heat pipe cavity. The ring-shaped cavity is divided into sector compartments by longitudinally extending barriers. Wicking material is disposed in respective compartments. The wicking material and flow restriction elements hold a portion of the heat transfer medium in the compartments while also allowing a portion of the heat transfer medium to move circumferentially around the roller to make temperature more consistent across the outer surface of the roller.

19 Claims, 4 Drawing Sheets

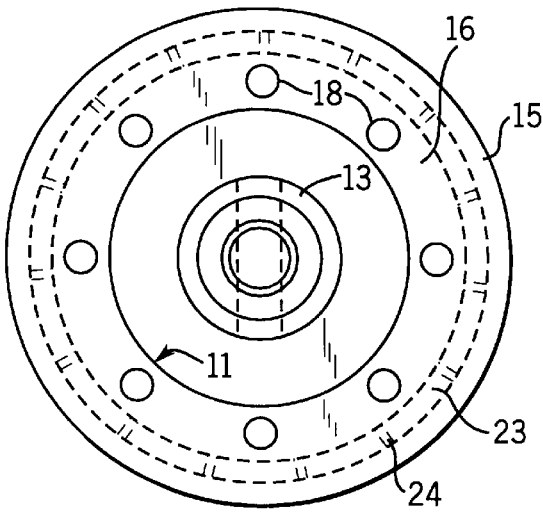
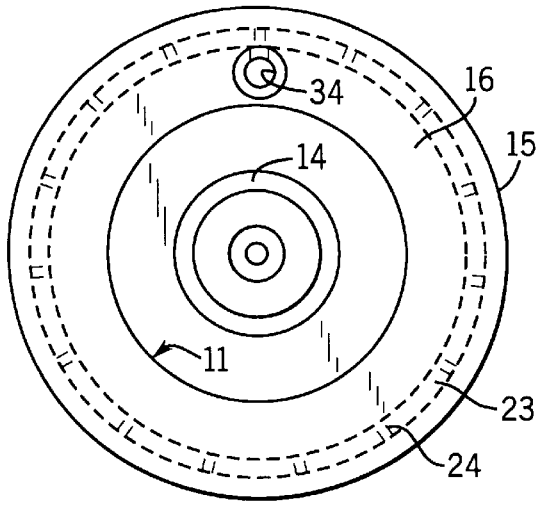
FIG. 2
FIG. 3
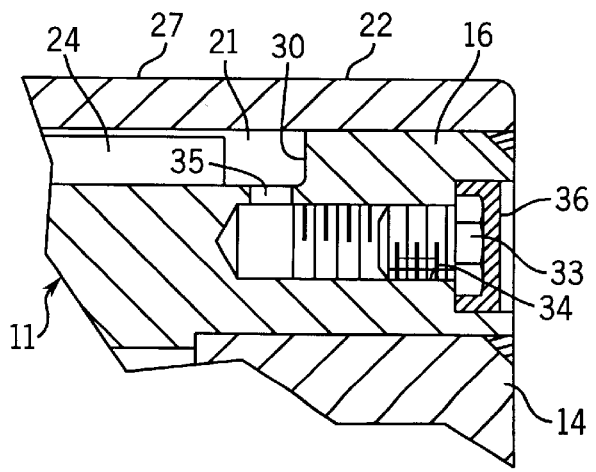
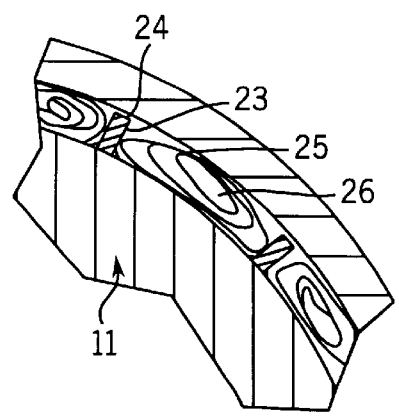
FIG. 4
FIG. 5

HEATED ROLLER WITH INTEGRAL HEAT PIPE

CROSS-REFERENCE TO RELATED APPLICATIONS

This is a continuation of application Ser. No. 08/783,597, filed Jan. 13, 1997, abandoned.

TECHNICAL FIELD

The invention relates to heater rollers for use in a variety of industrial machines.

DESCRIPTION OF THE BACKGROUND ART

Steam-heated and induction-heated rollers are used in the paper making, printing, paper, film, and foil converting industries. Some examples are: web heating rollers, drying rollers and drums, laminating rollers, embossing rollers, and cast film extrusion rollers.

Steam-heated rollers are actually pressure vessels, especially at higher temperatures. The internal construction of both steam-heated and induction-heated cores can be quite complex and expensive in order to provide the temperature uniformity needed. In addition, a considerable amount of auxiliary equipment is needed to power or heat the roller.

Hyllberg, U.S. Pat. No. 5,616,263, issued Apr. 1, 1997 and U.S. Pat. No. 5,869,808, issued Feb. 9, 1999 disclose a ceramic heater roller for use in industrial applications. Hyllberg, U.S. Pat. No. 5,408,070, discloses a ceramic heater roller with a heater layer and a heat regulating layer. Hyllberg et al., U.S. Pat. No. 5,420,395, discloses a roller in which the ceramic layer is divided into zones for zone heating and wires are used inside the core to connect to the various ceramic heating sections.

There is a basic problem with heated rollers in controlling the heating at the ends of the roller. When the width of a web of paper or other material is smaller than the heated length of the roller, the ends of the roller operate at a higher temperature than the portion covered by the web of paper or other material, which tends to dissipate heat from the covered portion of the roller. The higher temperature at the roller ends causes heat to migrate through the core and into the web area increasing temperature variation across the web. Also, the higher temperature at the ends can accelerate aging of an outer covering, where the outer covering is rubber, for example.

Heat pipe technology has been used to control heat in various kinds of equipment used for space exploration, remote monitoring stations and wherever heat transfer is required. A basic industrial heat pipe roller is disclosed in Noren, U.S. Pat. No. 3,700,028. As reported in Noren, "How Heat Pipes Work," *Chemical Engineering*, Aug. 19, 1974, acceptance of heat pipes in industry has been slow. Since that time a number of heat pipe constructions have been patented, often for small rollers used in office copiers and printers. Progress has remained slow, however, for industrial and large equipment applications.

The present invention is directed to a heater roller that controls temperature along the length and around the working surface of a cylindrical roller. This roller is advantageous for manufacture and overcomes many of the typical problems cited in the prior art.

SUMMARY OF THE INVENTION

The invention relates to a heater roller with improved temperature uniformity over the surface of the roller.

The invention can be applied to rollers heated by hot oil, steam, hot water, electricity or to rollers that are cooled by water or other media, and is particularly useful where heat is to be transferred to or from a moving web of material. The invention provides control of temperature over the roller surface, which is important for graphics arts rollers, fuser rollers, laminating and embossing rollers, pelletizer rollers, and nip, coating and web heating rollers. This includes rollers which are internally heated, such as fuser rollers, laminating rollers, embossing rollers and web heating rollers; rollers which are internally cooled, such as web cooling rollers; and rollers which are not internally heated or cooled from a source, but which require heating or cooling as a result of usage, such as graphics arts rollers, pelletizer rollers, nip rollers and coating rollers.

In one embodiment of the invention, the heater roller has a roller core and a sleeve of thermally conductive material, which together form a heat pipe cavity. The heat pipe cavity is subdivided into compartments by flow restriction elements spaced around the circumference. Wicking material and a heat transfer medium are disposed in the compartments. The wicking material tends to hold the heat-conducting medium, and the flow restriction elements hold the soaked wicking material in place. This prevents an uneven distribution or collection of medium at the bottom of the roller, when the roller is stopped.

In one variation of the basic embodiment, the wicking material is rolled up in coils to provide a greater amount of wicking material than seen in the prior art. In another variation, the wicking material is folded to form a corrugated layer of the material, which further forms the flow restriction elements.

The invention further provides for more even roller heating in the circumferential direction by providing clearances around the flow restriction elements to allow the medium to migrate in the circumferential direction.

The invention also provides for a uniform surface temperature even if the means for heating does not extend the full length of the roller. Resistance heaters can be placed to extend less than the full length of the roller.

The invention provides a roller with greater efficiency because heat is transferred with less variation than with cartridge or tube-type heat pipes, particularly in the circumferential direction. The invention allows the heat pipe to be positioned closer to the roller surface for heating of a larger external surface area. Cartridge or tube-type heat pipes require clearances and lubrication of the holes in which they are inserted. This creates thermal resistances. With the present invention, the heat pipe cavity does not require lubrication or clearance for a tube-type heat pipe and therefore provides more effective heating of the outer cylindrical roller surface.

Heat is transferred more uniformly at the roller working surface both circumferentially and across the face of the roller. There is no spacing between individual heat pipes as with cartridge or tube-type heat pipes.

Heat capacity can be increased more easily in terms of increasing the volume of the cavity. Since this is not the central cavity in the core, the central cavity can still be used for routing of wires or other functions.

The invention provides a heat pipe in a roller that can be more easily charged or evacuated, if necessary, through a charging port.

The invention provides an advantageous construction using a roller core and an outer shell without the need for end pieces between the roller core and the outer shell. This is advantageous in withstanding pressures that may be experienced in the heat pipe cavity.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

BRIEF DESCRIPTION OF THE DRAWINGS

FIG. 2 is a left end view of the roller of FIG. 1;

FIG. 3 is a right end view of the roller of FIG. 1;

FIG. 4 is an enlarged fragmentary view of a portion of the longitudinal section of FIG. 1;

FIG. 5 is a detail fragmentary view of a transverse section of the roller of FIG. 1;

DETAILED DESCRIPTION OF THE PREFERRED EMBODIMENT

Figure 1:
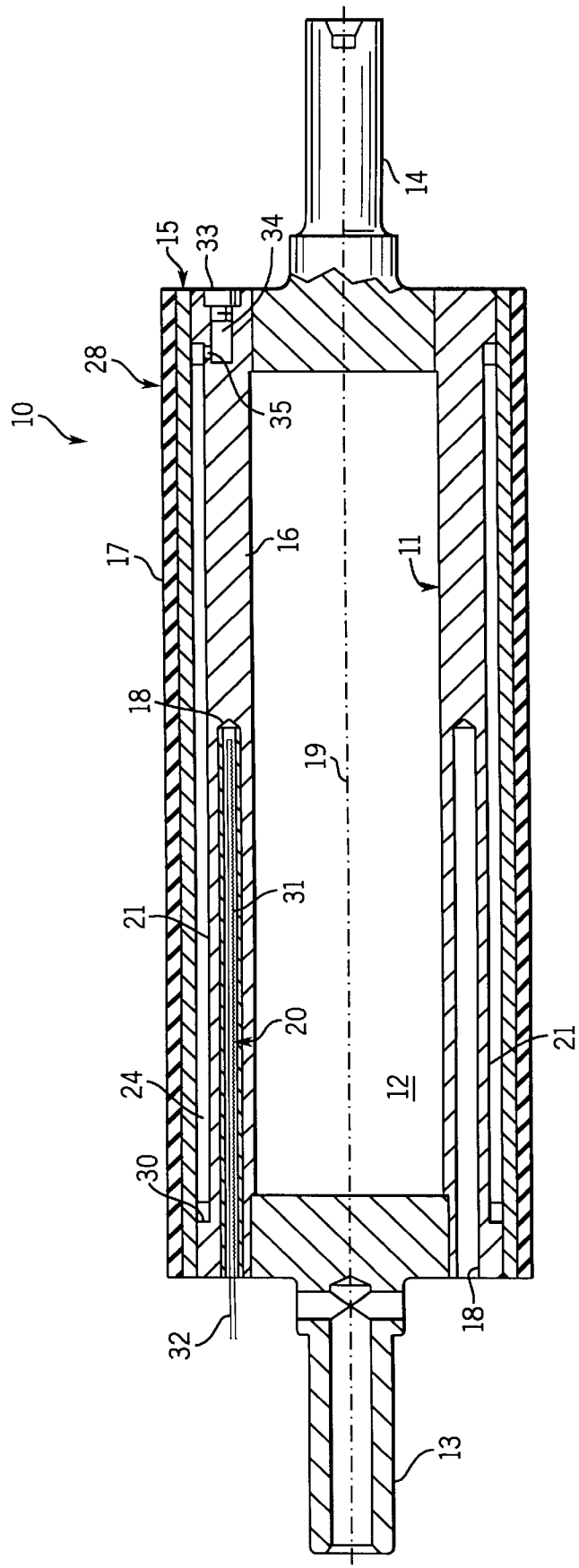
FIG. 1 is a longitudinal sectional view of a roller of the present invention.

Referring to FIG. 1, the invention is illustrated as a heater roller 10 having a cylindrical roller core 11 with an outer cylindrical wall 16 and a hollow cylindrical cavity 12 enclosed at opposite ends by roller journals 13, 14 inserted in the ends of the roller core 11. In the preferred embodiment, all components are made of metal unless otherwise stated, however, in other embodiments other heat-conducting materials could be used.

In the preferred embodiment, an outer cylindrical metal sleeve 15 forms an outer surface, or working surface, which contacts an object or web (not shown) to be processed using the roller. An optional elastomeric sleeve 28 (shown only in FIG. 1) of natural or synthetic rubber or another elastomer can also be disposed around the metal sleeve 15 to provide the outer surface 17. The working surface 17 could also be formed of chrome plating, ceramic, Teflon® or another material.

Extending longitudinally through the wall 16 from the left end or rotary end are bores 18, which are spaced around a circle at a certain radial distance from a central longitudinal axis 19 of rotation for the roller 10 (FIG. 2). Such bores are drilled for the purpose of receiving resistance-type cartridge heaters 20 in a position where they are close to the outer surface of wall 16. The cartridge heaters 20 extend into the wall 16 from one end of the roller, reaching approximately the middle of the roller core 11.

The resistance-type cartridge heaters 20 (shown schematically in FIG. 1) are readily available from a wide variety of manufacturers. The heater element typically comprises a length of nickel-chromium resistance wire 31 wound in spiral fashion around an insulating form (not shown), such as a ceramic rod. This assembly is sealed inside of a metal tube with tightly packed ceramic powder (magnesium oxide) insulating the wire from the tube. Wires 32 or other connections to power the heater 20 may exit from one or both ends of the tube. Such cartridge heaters 20 are available in sizes up to 3.175 cm (1.25 in.) in diameter and up to 121.92 cm (48 in.) in length.

A heat pipe 21 for the roller 10 is formed by the telescoping of cylinder 11 inside sleeve 15 which provides a sealed cavity 21 between them. The cavity 21 is ring-shaped (see FIGS. 2, 3) and extends along the length of the roller except for end portions 22 (FIG. 4), which are to be heated less than the central or web-carrying portion 27 (FIG. 4) of the roller 10. The cavity 21 may be plated with copper or nickel for corrosion protection. In the preferred embodiment, the cavity 21 is formed by a wide groove 30 that is machined in an outer surface of the inner cylinder 11. In other embodiments, the cavity 21 can be formed either in the inner cylinder or in the outer cylinder or by portions of both cylinders.

The primary heat pipe cavity 21 has at least the same, or greater, internal volume as the number of cartridge-type heat pipes that would be used for a roller of the same diameter and length. For example, in a 22.86 cm (9 in.)×152.4 cm (60 in.) roller with twenty-two individual heat pipes of 1.5875 cm (⅝ inch) diameter cartridges, 142.24 cm (56 inches) in length, a cavity of only 0.635 cm (0.25 in.) in height is needed to equal the volume of the individual heat pipes.

The resistance-type cartridge heaters 20 are used to heat the primary heat pipe cavity 21. Other types of resistance heaters, and other types of heaters known in the art could be used in place of the cartridge heaters 20. In a roller with a ceramic outer layer in place of layer 17, a ceramic heating layer could be disposed between the metal sleeve 15 and an outer ceramic layer, as disclosed in Hyllberg, U.S. Pat. No. 5,408,070.

Figure 7:
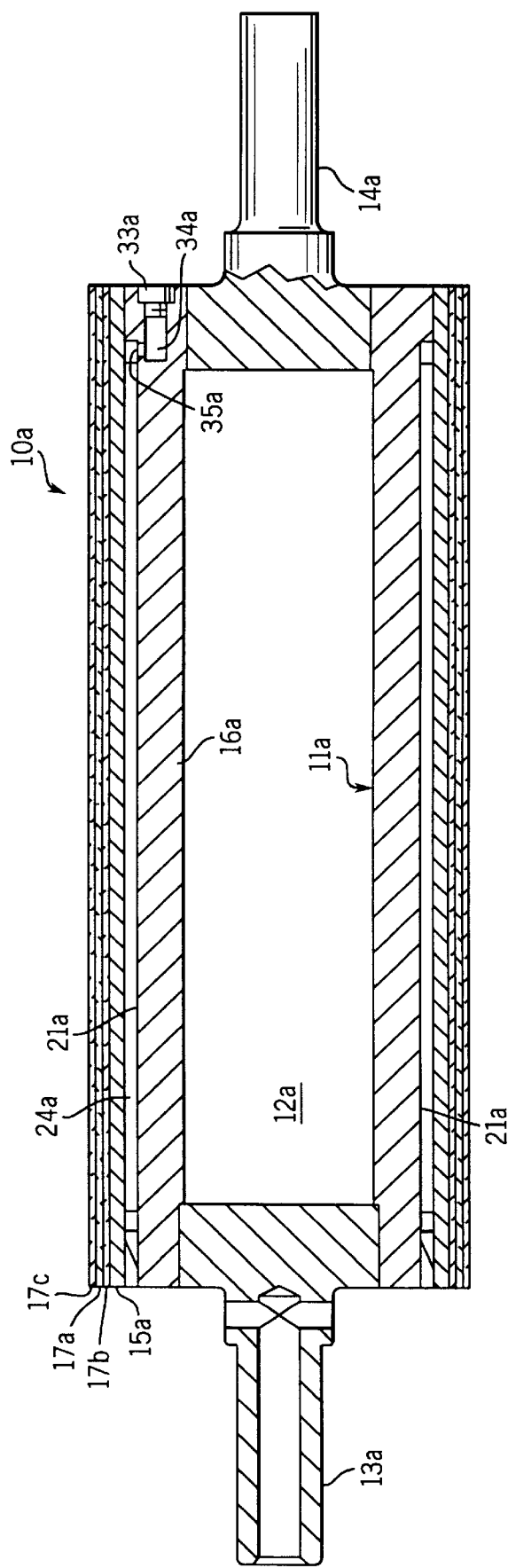
FIG. 7 is longitudinal sectional view of a second embodiment of the present invention.

As illustrated in FIG. 7, another embodiment of the heater roller 10a, which utilizes the heat pipe as described above, has a cylindrical roller core 11a with an outer cylindrical wall 16a and a hollow cylindrical cavity 12a enclosed at opposite ends by roller journals 13a, 14a inserted in the ends of the roller core 11a. An outer cylindrical metal sleeve 15a is disposed over and around the core 11a. The construction and operation of a heat pipe cavity 21a and elements 24a may be the same as that described for the first embodiment above. It is also possible to use the corrugated screen material 25a, 25b as described above. The difference from the embodiments described above is that a conductive or semiconductive ceramic heating layer 17a is disposed around the metal core 11a and sleeve 15a and is heated from a suitable supply of electricity through electrical connections of a type known in the art (not shown), which are made at opposite ends of the roller. With the use of the ceramic heating layer 17a, the use of cartridge heaters 20 illustrated in FIG. 1 is not necessary. Where it desired to the insulate ceramic heating layer 17a from the steel core 11, an inner ceramic insulating layer 17b is disposed over and around the metal sleeve 15a. Where the outer layer is to be a ceramic layer, an outer ceramic layer 17c that is thermally conductive, but electrically insulative, is used. Such ceramic layers 17a–17c can be formed of alumina and titania by thermal spraying or other techniques as disclosed in Hyllberg, U.S. Pat. No. 5,616,263 and Hyllberg, U.S. Pat. No. 5,408,070, cited above.

The operating pressure of the heat pipe is determined by the medium and operating temperature. The heat pipe cavity 21 is provided with some type of over pressure device (not shown), such as a pressure relief valve or preferably a pressure-rupture disk.

The medium 26 in the heat pipe 21 can be any material that is thermally stable, non-corrosive, and can exist both as a liquid and a gas in the temperature range in which the heat pipe will be used. For best operation, the atmospheric boiling point of the media is slightly below the operating temperature of the heat pipe 21. Water boils at 100° C. (212° F.) and functions best as a media above this temperature. But because there is a vacuum in the heat pipe (the only pressure is due to water vapor), water still works at temperatures below 65.5° C. (150° F.) A heat pipe can work efficiently well above the atmospheric boiling point and can also work reasonably well at low pressure. A low operating pressure allows the outer shell 15 of the roller 10 to be relatively thin. At 260° C. (500° F.), water has a vapor pressure of 47.804 kg/cm.$^2$ (680 psi) making it less desirable as the heat transfer medium 26 except in rollers with very strong, thick walls around the heat pipe cavity 21. Dowtherm A, a synthetic heat transfer fluid, would be preferred for operation at higher temperatures, such as 260° C. (500° F.) because it would produce an operating pressure of only about 1.054 kg/cm.$^2$ (15 psi) . This allows the outer shell wall to be relatively thin.

The ring-shaped heat pipe cavity 21 is divided into sector compartments 23 by longitudinal flow restriction elements 24. The flow restriction elements 24 have been formed by welding long pieces of steel flat stock across the wide groove 30 in the wall 16 of the inner cylinder 11. When viewed in FIGS. 2 and 3, the flow restriction elements 24 are disposed along radii from the axial center of the roller 10. Rolled-up coils of wicking material 25 (FIG. 5) are disposed in respective compartments 23. This wicking material 25 is typically a fine-mesh wire screen. The square footage of the wicking material in the compartments 23 is much greater than the typical flat piece of wicking material in a non-segmented cavity 21. The wound coils assure that the webbing is constrained within the compartments 23 and contacts the interior surfaces of the compartments 23. The wicking material 25 holds a portion of the heat transfer medium 26, and the flow restriction elements 24 hold the soaked wicking material 25 in place. This construction reduces the the tendency for an uneven distribution or collection of medium at the bottom of the roller 10, when the roller 10 is stopped.

Figure 6:
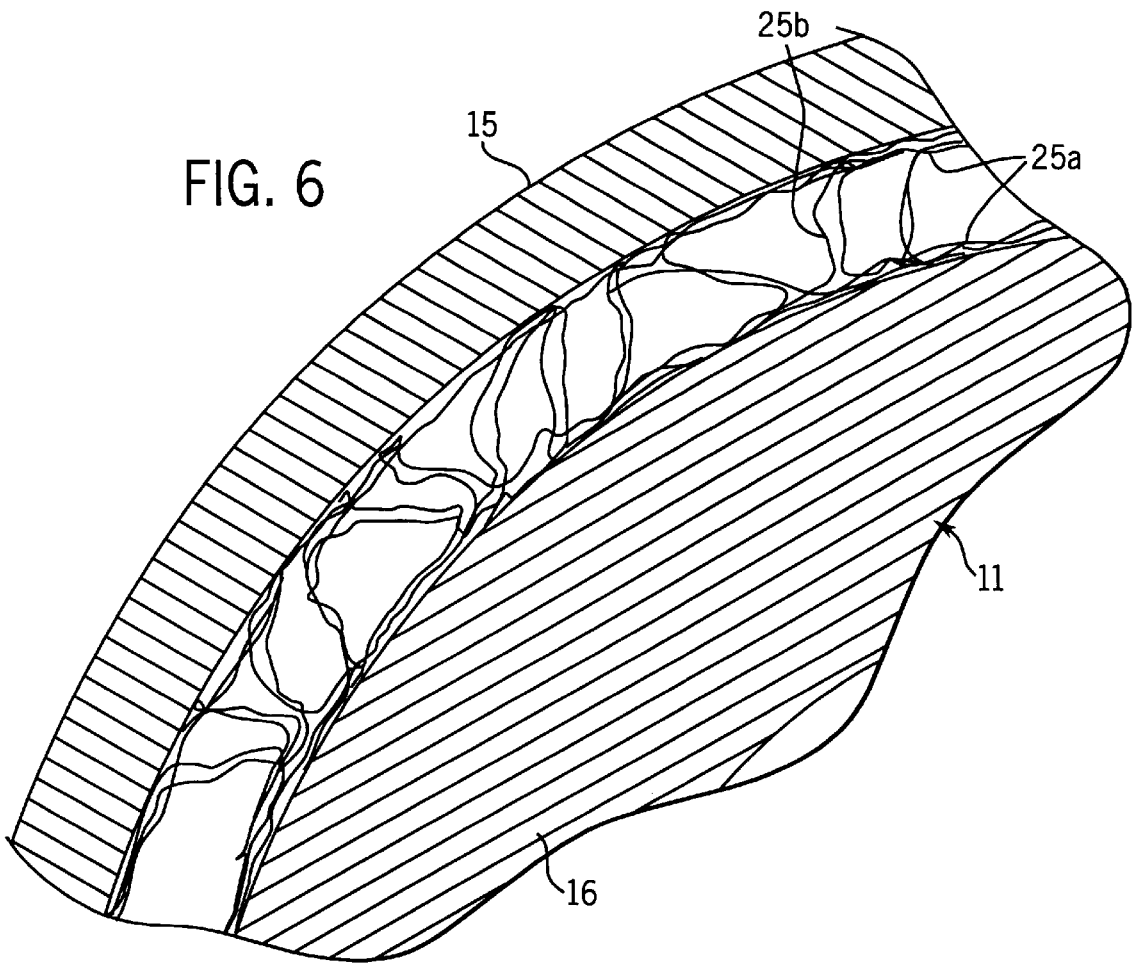
FIG. 6 is a detail fragmentary view of a transverse section of a second embodiment of the roller of the present invention.

In another embodiment illustrated by FIG. 6, a layer of screen material 25b is folded in corrugations and the layer wrapped around the core 11. The folds in the screen material 25b act as flow restriction elements 25b in place of the flow restriction elements 24. A first additional layer of screen material 25a is also wrapped around the inner core 11 and a second layer of screen material 25a is wrapped around the folded layer of material 25b to provide good contact with the surfaces of cavity 21.

In still other embodiments, the wicking material might be replaced by grit-blasted surfaces inside each compartment and then thermal metal spraying of these surfaces to give the surfaces a texture. The coils 25 and barrier members 24 hold most of the heat transfer medium 26 in the compartments 23 as the roller 10 is rotated to provide controlled heating of the roller 10 along its length and at its ends. There are clearances between the flow restriction elements 24 and the inside of sleeve 15. There are also clearances between the ends of the barrier members 24 and the inside of the cavity 21. These clearances allow some medium to flow between compartments 23 to assure uniform temperature distribution over the working surface 17.

As seen in FIG. 4, a hex-head threaded plug 33 is screwed into the threaded port 34. The port 34 connects through a passage 35 to the heat pipe cavity 21. The port 34 allows for evacuation of the medium 26 and for charging with the medium 26. Brazing 36 or solder can be used to seal the head of plug 33, and hold it in position in port 34.

In the illustrated embodiment, the internal temperature of the core is higher than the outer surface 17. The invention is also practiced with a ceramic layer 17a (FIG. 7) in place of the rubber sleeve 28. In that embodiment, the temperature of the core would be lower than the temperature in the ceramic layer 17a. In both embodiments, the heat pipe 21 would provide for improved temperature uniformity across and around the outer roller surface 17.

This has been a description of examples of how the invention can be carried out. Those of ordinary skill in the art will recognize that various details may be modified in arriving at other detailed embodiments, and these embodiments will come within the scope of the invention.

While the preferred embodiment of the invention is described with reference to industrial applications, the invention may also have advantages in printing machines and copying machines.

Therefore, to apprise the public of the scope of the invention and the embodiments covered by the invention, the following claims are made.

We claim:

1. A heatable transfer roller usable in a machine for coating, printing, copying or web heating, the roller comprising:

a roller core of a thermally conductive material, the roller core having an inner hollow cavity and an outer wall around the inner cavity;

a sleeve of a thermally conductive material disposed on the roller core for conducting heat with respect to an object contacting an outer surface of the roller;

wherein the roller core and the sleeve form a ring-shaped cavity for receiving a heat transfer medium having a liquid portion and a vapor portion, the ring-shaped cavity extending the length of the roller excluding portions on respective ends of the roller;

means for transfer of heat in relation to the heat transfer medium in the ring-shaped cavity;

flow restriction elements disposed around the circumference of the roller core and within said cylindrical cavity to form compartments, wherein the compartments in transverse section form sectors of the ring-shaped cavity; and a wicking material for wicking the heat transfer medium, said flow restriction elements tending to retain the wicking material and the liquid portion of the heat transfer medium inside of said sector compartments, while also allowing the vapor portion of the heat transfer medium to move circumferentially around the roller to make temperature more consistent across the outer surface of the roller.

2. The roller of claim 1, wherein roller core is cylindrical and wherein the ring-shaped cavity is formed by a wide groove in the outer wall of the cylindrical roller core.

3. The roller of claim 1, wherein the means for transfer of heat in relation to the heat transfer medium comprises a plurality of cartridge heaters extending longitudinally through a portion of the outer wall.

4. The roller of claim 1, wherein roller core is made of metal.

5. The roller of claim 4, wherein the sleeve is made of metal.

6. The roller of claim 1, wherein the the wicking material is formed by a plurality of coils of wire screen disposed in the respective compartments.

7. The roller of claim 1, wherein an outer sleeve of elastomeric material is provided to cover said first-mentioned sleeve.

8. The roller of claim 1, wherein a port is formed in one end of the roller, said port communicating with said ring-shaped cavity to allow evacuation and recharging with the heat transfer medium.

9. The roller of claim 1, wherein the ring-shaped cavity is formed by a wide groove in the roller core and the sleeve which encloses said groove to form the ring-shaped cavity.

10. The roller of claim 1, wherein the barriers are formed by flat members without holes that would allow medium to flow between compartments, said members extending longitudinally in said cavity and having a height extending along a radius from an axis of the roller core.

11. A heatable transfer roller usable in a machine for coating, printing, copying or web heating, the roller comprising:

a roller core of a thermally conductive material, the roller core having an inner hollow cavity and an outer wall around the inner cavity;

a sleeve of a thermally conductive material disposed on the roller core for conducting heat with respect to an object contacting an outer surface of the roller;

wherein the roller core and the sleeve form a ring-shaped cavity for receiving a heat transfer medium, the ring-shaped cavity extending the length of the roller excluding portions on respective ends of the roller and said cavity having an inner interior surface and an outer interior surface relative to the roller core;

means for transfer of heat in relation to the heat transfer medium in the ring-shaped cavity;

flow restriction elements disposed around the circumference of the roller core and within said cylindrical cavity to form compartments;

a wicking material for wicking the heat transfer medium, said flow restriction elements tending to retain the wicking material and the heat transfer medium inside of said compartments, while also allowing the heat transfer medium to move circumferentially around the roller to make temperature more consistent across the outer surface of the roller; and wherein the flow restriction elements are formed by the wicking material, which further comprises a wire screen with transverse folds, the wire screen extending circumferentially in said cavity, and wherein said transverse folds extend across the cavity from near the inner interior surface to near the outer interior surface.

12. The roller of claim 11, wherein the wicking material further includes at least one unfolded layer of wire screen that extends around the roller core; and wherein a portion of wire screen with transverse folds is disposed over the unfolded layer and extends circumferentially around the roller core, the transverse folds traversing between the inner interior surface and the outer interior surface of the cavity.

13. The roller of claim 1, wherein the outer surface of the roller is a metal surface provided by the sleeve which forms the cavity.

14. The roller of claim 1, further comprising a cover material disposed over the sleeve that forms the cavity.

15. The roller of claim 14, wherein the cover material is an elastomer, a ceramic material, Teflon or chrome.

16. The roller of claim 1, wherein the means for transfer of heat in relation to the heat transfer medium comprises a ceramic heating material formed around the outer wall of the roller core, said ceramic heating material being at least semiconductive of electrical current to produce resistive heating in the roller.

17. The roller of claim 16, wherein an outer layer of insulating ceramic material is provided to cover said ceramic heating material to provide a working surface for contacting an external object.

18. The roller of claim 16, further comprising a cover layer disposed over the ceramic heating material.

19. The roller of claim 18, wherein the cover layer is made of a material selected from a group consisting of an elastomer, a ceramic material, Teflon or chrome.

\* \* \* \* \*